United States Patent
Zhou et al.

(10) Patent No.: US 11,863,874 B2
(45) Date of Patent: Jan. 2, 2024

(54) ALGORITHM TO CORRECT CAMERA EARLY SATURATION FLOOR FOR AUTOEXPOSURE ALGORITHM

(71) Applicant: MLOptic Corp, Redmond, WA (US)

(72) Inventors: Wei Zhou, Sammamish, WA (US); Nathan Yang, Bellevue, WA (US); Wei Wang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 186 days.

(21) Appl. No.: 17/567,105

(22) Filed: Dec. 31, 2021

(65) Prior Publication Data

US 2023/0232111 A1    Jul. 20, 2023

(51) Int. Cl.
*H04N 23/73* (2023.01)
*H04N 23/71* (2023.01)
*H04N 25/71* (2023.01)

(52) U.S. Cl.
CPC ............. *H04N 23/73* (2023.01); *H04N 23/71* (2023.01); *H04N 25/71* (2023.01)

(58) Field of Classification Search
CPC ......... H04N 23/71; H04N 23/73; H04N 25/71
See application file for complete search history.

(56) References Cited

U.S. PATENT DOCUMENTS 11,425,311 B1 *    8/2022    Zhou .................... H04N 23/73

FOREIGN PATENT DOCUMENTS

CN    105979162 A *    9/2016    ........... H04N 5/2352

OTHER PUBLICATIONS

Machine Translation of CN-105979162-A to Xie et al dated Sep. 2016 (Year: 2016).*
Yuanhang Su, Joe Yuchieh Lin, C.-C. Jay Kuo, A model-based approach to camera's auto exposure control, J. Vis. Commun. Image R. 36 (2016) 122-129, M.T. Sun, 5-A-201 Changxing Hao Rizi, Xinbei District, Changzhou, Jiangsu, China.

* cited by examiner

*Primary Examiner* — Daniel M Pasiewicz
(74) *Attorney, Agent, or Firm* — Jong Patent Firm; Cheng Ning Jong; Tracy P. Jong

(57) ABSTRACT

A method for controlling an autoexposure function of a camera to a gray level setting, the method including establishing a critical exposure time of an image sensing device of the camera, wherein the critical exposure time of the image sensing device of the camera is an exposure time at which a first sensed gray level of the image sensing device of the camera is disposed at a target gray level, the sensed gray level is disposed in a trend of decreasing sensed gray level values; exposing the image sensing device of the camera to light to obtain a second sensed gray level and comparing the second sensed gray level at the critical exposure time to the target gray level, if the second sensed gray level is disposed at least at the target gray level, limiting the exposure of the image sensing device of the camera to the critical exposure time.

5 Claims, 3 Drawing Sheets

ALGORITHM TO CORRECT CAMERA EARLY SATURATION FLOOR FOR AUTOEXPOSURE ALGORITHM

BACKGROUND OF THE INVENTION

1. The Field of the Invention

The present invention relates to an algorithm to correct a camera early saturation floor problem in connection to its autoexposure algorithm. More specifically, the present invention is directed to an algorithm to correct a CCD camera early saturation floor problem in connection to its autoexposure algorithm.

2. Background Art

Autoexposure (AE) control of digital cameras, e.g., complementary metal-oxide-semiconductor (CMOS) and charge-coupled device (CCD) remains a subject of scrutiny due to several challenges that still plague these technologies. Applicant discovered that, on certain cameras, the AE control is plagued with the non-convergence of target gray levels due to the traditional assumption of a linear or piece-wise linear relationship between the exposure time and the image brightness level, resulting in the underexposure of the images on the displays of these cameras. A generic AE control algorithm which treats the relationship between the exposure time and the image brightness level as linear or piece-wise linear, fails to take into account that the image brightness level of a certain camera can never recover from its early dip in the image brightness level. Therefore, an autoexposure algorithm based solely on the image brightness level would never reach its target gray level according to the gray level setting of the AE function of the camera. In addition, an AE control strategy that caters to bright light may inadvertently cause its malfunction under dim light conditions.

There exists a need to ensure that an AE control can be successfully performed on CCD cameras experiencing this early saturation floor problem in their exposure to bright light and dim light.

SUMMARY OF THE INVENTION

In accordance with the present invention, there is provided a method for controlling an autoexposure (AE) function of a camera to a gray level setting, the method including:
(a) establishing a critical exposure time of an image sensing device of the camera, wherein the critical exposure time of the image sensing device of the camera is an exposure time at which a first sensed gray level of the image sensing device of the camera is disposed at a target gray level according to the gray level setting and the sensed gray level is disposed in a trend of decreasing sensed gray level values;
(b) exposing the image sensing device of the camera to light to obtain a second sensed gray level of the image sensing device of the camera; and
(c) comparing the second sensed gray level at the critical exposure time to the target gray level, if the second sensed gray level is disposed at least at the target gray level, limiting the exposure of the image sensing device of the camera to the critical exposure time.

In one embodiment, the method further includes determining a minimum required exposure time of the image sensing device of the camera if the second sensed gray level is disposed at least at the target gray level, the determining step includes exposing the image sensing device of the camera to light for an exposure time that is less than the critical exposure time and obtaining a third sensed gray level of the image sensing device of the camera, wherein if the third sensed gray level is not the same as the target gray level, iterate the determining step until the third sensed gray level is the same as the target gray level to obtain the minimum required exposure time. In one embodiment, the camera is an imaging device adapted to function according to the principles of an image sensing device of a charge-coupled device (CCD) camera.

An object of the present invention is to provide an autoexposure method which provides a solution to a non-converging autoexposure routine where the non-converging autoexposure routine is based solely on image brightness received at an image sensing device.

Another object of the present invention is to provide an autoexposure method which corrects for the non-convergence of a prior art autoexposure routine due to a camera early saturation floor problem such that an appropriate brightness or gray level is represented at the output or display of the image sensing device.

Another object of the present invention is to provide an autoexposure method which corrects for a camera early saturation floor with a solution which converges expeditiously.

Another object of the present invention is to provide an autoexposure method that is simple to implement.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—control device
4—image sensing device, e.g., charge-coupled device (CCD) pixels
6—display
8—step of establishing critical exposure time
10—step of exposing image sensing device to light
12—step of comparing the second sensed gray level at the critical exposure time to target gray level and limiting exposure time of image sensing device
14—step of determining minimum required exposure time
16—user or observer
18—saturation point
20—curve corresponding to exposure to bright light
22—curve corresponding to exposure to dim light Particular Advantages of the Invention In one embodiment, the present method or algorithm provides a solution to a non-converging autoexposure routine where the non-converging autoexposure routine is based solely on image brightness received at an image sensing device. In one embodiment, the present method or algorithm provides an autoexposure method which corrects for the non-convergence of a prior art autoexposure routine due to a camera early saturation floor problem such that an appropriate brightness or gray level is represented at the output or display of the image sensing device. In one embodiment, the present autoexposure method provides a solution which converges expeditiously. In all embodiments of the present invention, the solutions for the non-converging autoexposure routine and the optimization useful for reducing delays in convergence can be implemented without significant impacts to the cost of computation.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
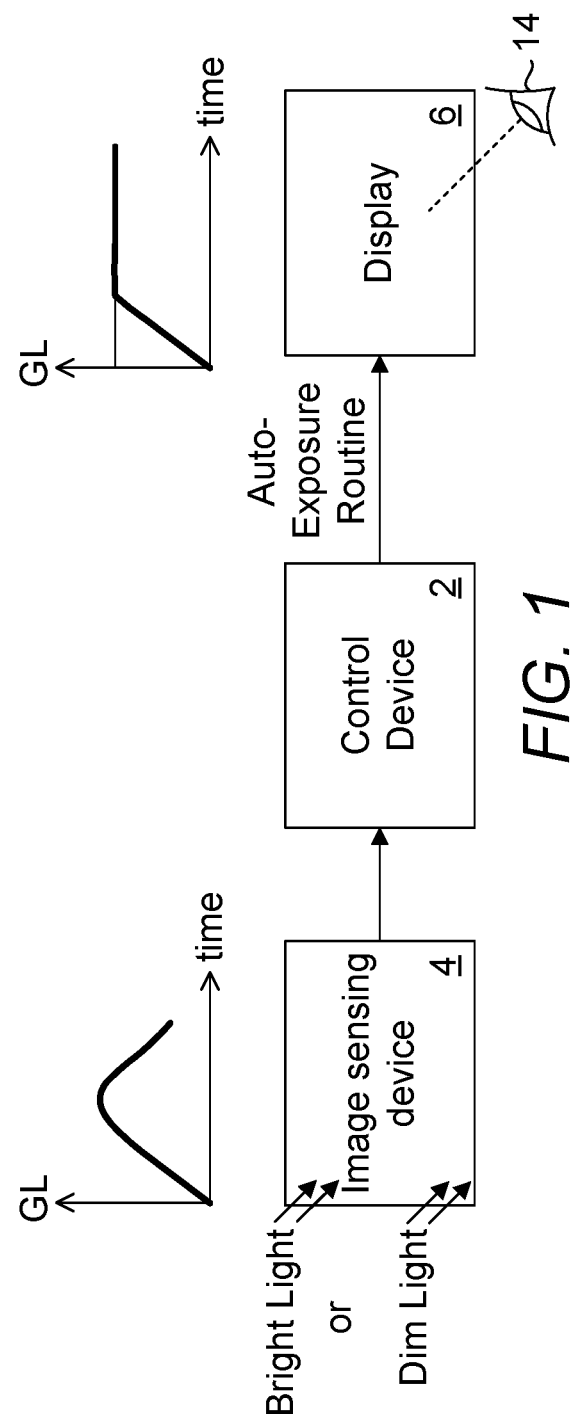
FIG. 1 is a diagram depicting a system which shows an input to an image sensing device and an output device having its image brightness controlled by an autoexposure routine of a control device.

FIG. 1 is a diagram depicting a system which shows an input to an image sensing device 4 and an output device having its image brightness controlled by an autoexposure routine of a control device 2. The image sensing device 4 is a charge-coupled device (CCD) of a camera or any CCD adapted to function according to the principles of an image sensing device of a (CCD) camera. Both the image sensing device 4 and display 6 are functionally connected to the control device 6. In one example, an image sensing device 4 includes a semiconductor divided up into pixels. As light hits a pixel, the pixel can be filled with one or more electrons. The gray level output of the pixel corresponds to the number of electrons in the pixel. This output is received at the control device 2 before it is operated on such that a modified output based on the output received from the image sensing device 4 can be provided to the display 6 where the image brightness of an image is discernible by a user 16. In this example, the modified output is shown to a user 16. However, this modified output may also be used by an image processing algorithm where the appropriate brightness or gray level of the modified output can affect the manner in which features are extracted from the modified output. Therefore it is important for the modified output to be disposed at an appropriate brightness. The control device 2 represents any device configured to receive the output from image sensing device 4, generates a modified output using, e.g., a resident autoexposure (AE) routine or a remotely-located AE routine and communicates this modified output to the display.

Figure 2:
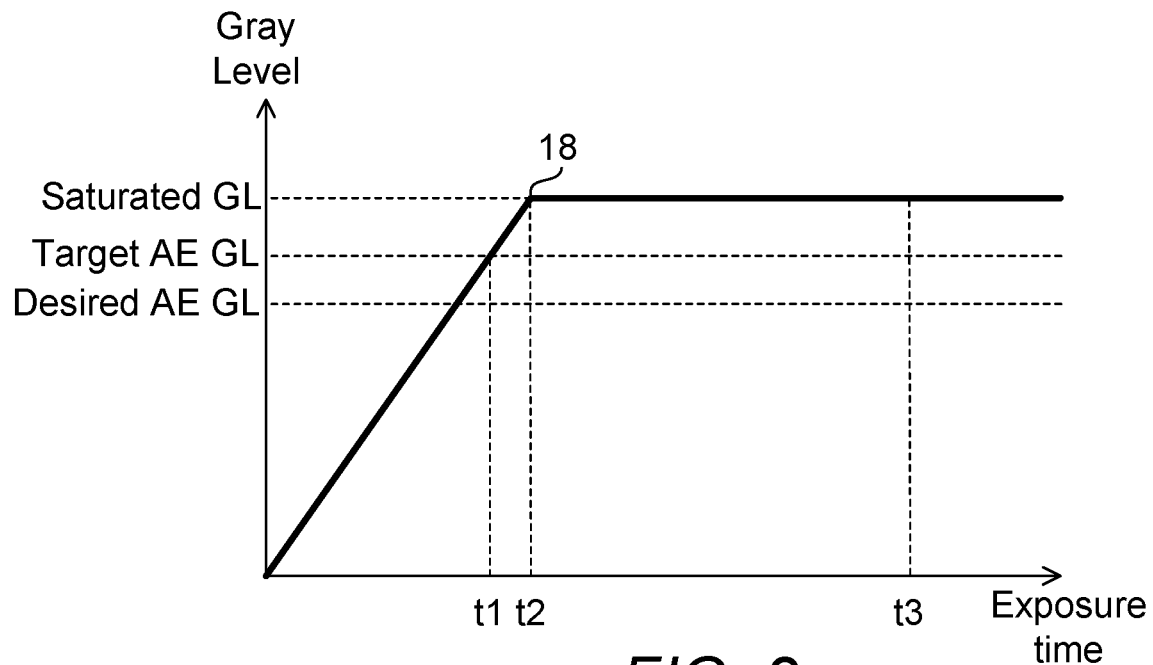
FIG. 2 is a chart relating the image brightness and exposure time of an image sensing device, showing a theoretical or assumed gray level response of a conventional CCD image sensing device.
Figure 3:
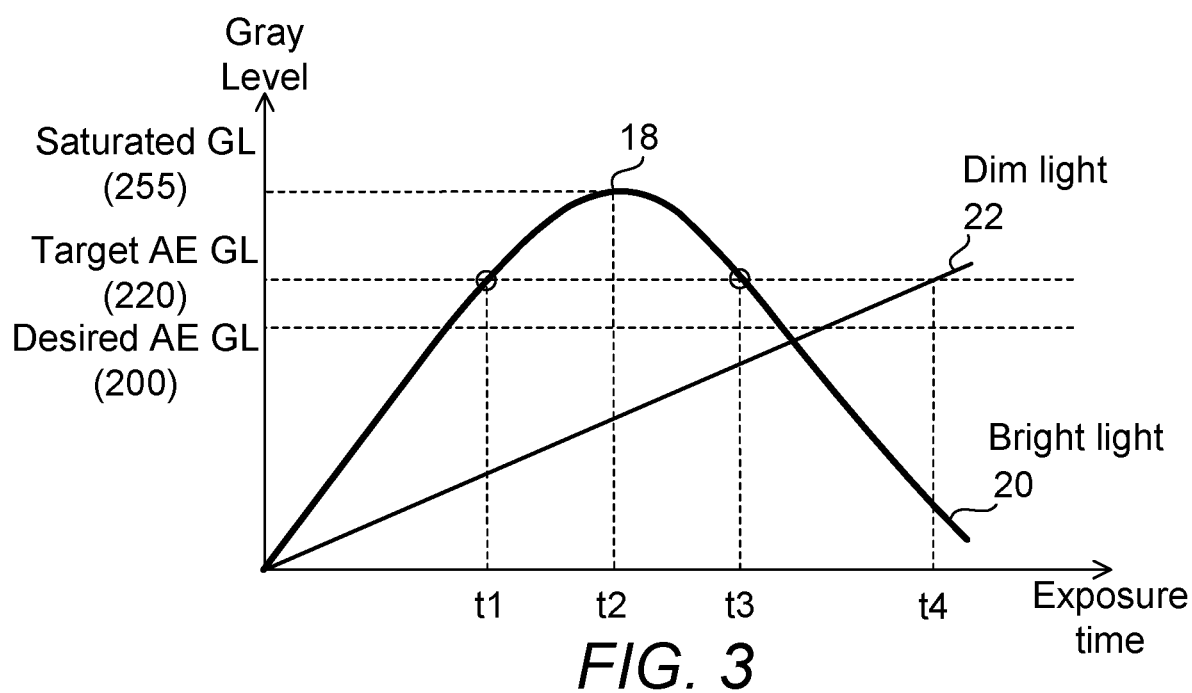
FIG. 3 is a chart relating the image brightness and exposure time of an image sensing device, showing an early saturation floor problem of a CCD image sensing device.

FIG. 2 is a chart relating the image brightness and exposure time of an image sensing device showing a theoretical or assumed gray level response of a conventional CCD image sensing device. It shall be noted that the gray level response rises substantially proportionally with time until time t2, at which point additional exposure to light does not alter the gray level as it reaches the saturation point 18. FIG. 2 depicts an image brightness-exposure time curve applicable to some CCD image sensing devices and modified outputs or autoexposure-applied outputs received at a display. However, Applicant discovered that in some CCD systems, anomalies do occur where the image brightness does not correspond proportionally with exposure time. One such example is illustrated in FIG. 3. FIG. 3 is a chart relating the image brightness and exposure time of an image sensing device, showing an early saturation floor problem of a CCD image sensing device. It shall be noted that curve 20 shows an increasing trend before reaching a peak and subsequently decreasing to a low gray level even with a longer exposure time. A common practice to attempt to resolve this issue is by modifying the output from an image sensing device with a gain sufficiently significant to raise the decreasing portion of curve 20. It shall be noted however that, by applying a large gain, when the image sensing device is exposed to dim light, the displayed image will appear overexposed and the noise floor is significantly increased. Therefore, in the present solution to the early saturation floor problem, potential problems that can occur for exposure to a dim light condition must be considered.

Figure 4:
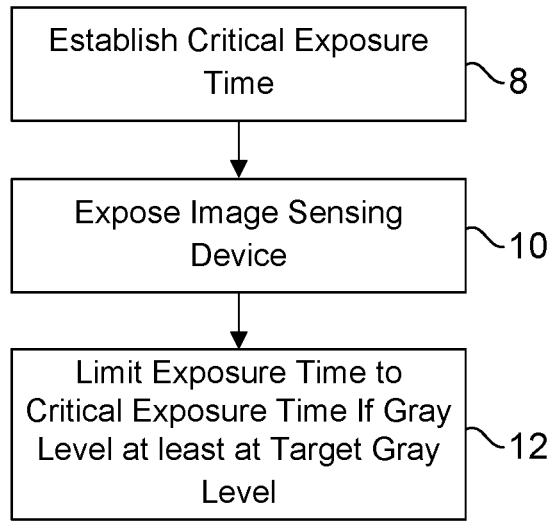
FIG. 4 is a flow diagram depicting an autoexposure routine suitable for correcting an early saturation floor problem of a CCD image sensing device.

FIG. 4 is a flow diagram depicting an autoexposure routine suitable for correcting an early saturation floor problem of a CCD image sensing device 4. In one embodiment, this method can be applied to an existing CCD system by intercepting and replacing the routine that operates on the output from the image sensing device 4. In another embodiment, this method can be integrally applied to a new build of a CCD system. In controlling an autoexposure (AE) function of a camera to a gray level setting, e.g., "Desired AE GL" of 200 for an 8-bit system, the present method includes:

(a) establishing 8 a critical exposure time of an image sensing device of the camera, wherein the critical exposure time, e.g., t3, of the image sensing device of the camera is an exposure time at which a first sensed gray level of the image sensing device of the camera is disposed at a target gray level, e.g., "Target AE GL" of 220 of the same 8-bit system, according to the gray level setting of 200. The target gray level is essentially the gray level setting with a tolerance. The first sensed gray level is disposed in a trend of decreasing sensed gray level values at t3. Contrast this to the point where "Target AE GL" is disposed at 220 and at time t1. The point at t3 is chosen as, although t1 represents a smaller exposure duration, setting the exposure time to t1 can severely affect the convergence of autoexposure under a dim light condition represented by curve 22. In other words, for situations where the image sensing device is routinely required to be exposed to the bright light and dim light condition alternatingly, setting the exposure time to t1 would only favor the convergence of the bright light scenario as t1<t3, i.e., with smaller amounts of delay. This step can be carried out through a calibration or measurement process of an image sensing device and its corresponding AE routine;

(b) exposing 10 the image sensing device of the camera to light to obtain a second sensed gray level of the image sensing device of the camera. Here, an image is about to be captured with the camera and therefore the image sensing device is exposed; and (c) comparing 12 the second sensed gray level at the critical exposure time (or t3) to the target gray level of 220, if the second sensed gray level is disposed at least at the target gray level of 220, limiting the exposure of the image sensing device of the camera to the critical exposure time. It shall be noted that, the act of limiting the exposure of the image sensing device of the camera to the critical exposure time would not be performed under the dim light condition as the second sensed gray level would not be disposed at least at the target gray level of 220, thereby avoiding any negative impacts that can be potentially exerted to the autoexposure process of a dim light condition.

Figure 5:
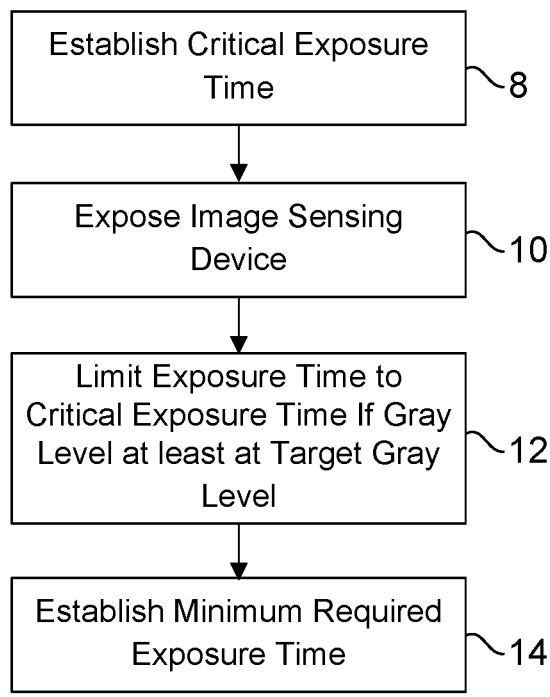
FIG. 5 is a flow diagram depicting an autoexposure routine suitable for correcting an early saturation floor problem of a CCD image sensing device and shortening the convergence of the routine.

FIG. 5 is a flow diagram depicting an autoexposure routine suitable for correcting an early saturation floor problem of a CCD image sensing device and shortening the convergence of the routine. This embodiment is useful for decreasing the exposure time in achieving the target gray level when the present autoexposure routine is applied to another exposure having a similar light condition. In this embodiment, the method further includes determining 14 a minimum required exposure time t1 of the image sensing device 4 of the camera if the second sensed gray level is disposed at least at the target gray level of 220, the determining step includes exposing the image sensing device of the camera to light for an exposure time that is less than the critical exposure time (or t3) and obtaining a third sensed gray level of the image sensing device of the camera. If the third sensed gray level is not the same as the target gray level, iterate the determining step until the third sensed gray level is the same as the target gray level of 220 to obtain the minimum required exposure time. It shall be noted that the iteration for the target gray level of 220 is headed in the direction of diminishing exposure time and not in the direction of increasing exposure time which would have led the autoexposure routine in a direction where the target gray level would never be located.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for controlling an autoexposure (AE) function of a camera to a gray level setting, said method comprising:

(a) establishing a critical exposure time of an image sensing device of the camera, wherein said critical exposure time of the image sensing device of the camera is an exposure time at which a first sensed gray level of the image sensing device of the camera is disposed at a target gray level according to the gray level setting and the first sensed gray level is disposed in a trend of decreasing sensed gray level values;

(b) exposing the image sensing device of the camera to light to obtain a second sensed gray level of the image sensing device of the camera; and (c) comparing said second sensed gray level at said critical exposure time to said target gray level, if said second sensed gray level is disposed at least at said target gray level, limiting the exposure of the image sensing device of the camera to said critical exposure time.

2. The method of claim 1, further comprising determining a minimum required exposure time of the image sensing device of the camera if said second sensed gray level is disposed at least at said target gray level, said determining step comprises exposing the image sensing device of the camera to light for an exposure time that is less than said critical exposure time and obtaining a third sensed gray level of the image sensing device of the camera, wherein if said third sensed gray level is not the same as said target gray level, iterate said determining step until said third sensed gray level is the same as said target gray level to obtain said minimum required exposure time.

3. The method of claim 1, wherein the camera is an imaging device adapted to function according to the principles of an image sensing device of a charge-coupled device (CCD) camera.

4. A method for controlling an autoexposure (AE) function of a camera to a gray level setting, said method comprising:

(a) establishing a critical exposure time of an image sensing device of the camera, wherein said critical exposure time of the image sensing device of the camera is an exposure time at which a first sensed gray level of the image sensing device of the camera is disposed at a target gray level according to the gray level setting and the first sensed gray level is disposed in a trend of decreasing sensed gray level values;

(b) exposing the image sensing device of the camera to light to obtain a second sensed gray level of the image sensing device of the camera;

(c) comparing said second sensed gray level at said critical exposure time to said target gray level, if said second sensed gray level is disposed at least at said target gray level, limiting the exposure of the image sensing device of the camera to said critical exposure time; and (d) determining a minimum required exposure time of the image sensing device of the camera if said second sensed gray level is disposed at least at said target gray level, said determining step comprises exposing the image sensing device of the camera to light for an exposure time that is less than said critical exposure time and obtaining a third sensed gray level of the image sensing device of the camera, wherein if said third sensed gray level is not the same as said target gray level, iterate said determining step until said third sensed gray level is the same as said target gray level to obtain said minimum required exposure time.

5. The method of claim 4, wherein the camera is an imaging device adapted to function according to the principles of an image sensing device of a charge-coupled device (CCD) camera.

* * * * *